(12) United States Patent
Wu et al.

(10) Patent No.: US 11,861,872 B2
(45) Date of Patent: *Jan. 2, 2024

(54) LOGIN METHOD BASED ON FINGERPRINT RECOGNITION AND DEVICE

(71) Applicant: Huawei Technologies Co., Ltd., Shenzhen (CN)

(72) Inventors: Chenglin Wu, Wuhan (CN); Juntao Chen, Wuhan (CN); Feipeng Shang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/712,400

(22) Filed: Apr. 4, 2022

(65) Prior Publication Data

US 2022/0230468 A1    Jul. 21, 2022

Related U.S. Application Data

(63) Continuation of application No. 16/608,517, filed as application No. PCT/CN2017/082553 on Apr. 28, 2017, now Pat. No. 11,341,349.

(51) Int. Cl.
| | | |
|---|---|---|
| *G06V 40/12* | (2022.01) | |
| *G06F 21/32* | (2013.01) | |
| *G06V 30/19* | (2022.01) | |
| *G06V 30/18* | (2022.01) | |

(52) U.S. Cl.
CPC .......... *G06V 40/1365* (2022.01); *G06F 21/32* (2013.01); *G06V 30/18* (2022.01); *G06V 30/19* (2022.01)

(58) Field of Classification Search
CPC .... G06V 40/1365; G06V 30/18; G06V 30/19; G06F 21/32; G06F 1/1671; G06F 1/26; H04L 63/0861; H04W 12/06; H04W 12/08

See application file for complete search history.

(56) References Cited

U.S. PATENT DOCUMENTS

| | | | | |
|---|---|---|---|---|
| 5,963,679 A * | 10/1999 | Setlak | ...................... | G07C 9/37 382/312 |
| 9,135,495 B1 * | 9/2015 | Pope | .................. | G06V 40/1306 |
| 11,341,349 B2 * | 5/2022 | Wu | .............. | G06F 1/26 |
| 2007/0076923 A1 * | 4/2007 | Chiu | ..................... | G06V 40/13 382/124 |
| 2008/0253624 A1 | 10/2008 | Wong et al. | | |
| 2013/0249463 A1 | 9/2013 | Nishikimi | | |
| 2015/0169859 A1 | 6/2015 | Wang | | |
| 2015/0254446 A1 | 9/2015 | Lacous et al. | | |

(Continued)

FOREIGN PATENT DOCUMENTS

| | | |
|---|---|---|
| CN | 101241525 A | 8/2008 |
| CN | 101286190 A | 10/2008 |

(Continued)

*Primary Examiner* — John B Strege

(74) *Attorney, Agent, or Firm* — Conley Rose, P.C.

(57) ABSTRACT

A fingerprint recognition method and terminal device provide authentication by simultaneously collecting fingerprint data when a power-on signal is detected, attempting to match the fingerprint data with preset fingerprint data, and logging in to the terminal device proceeds when the matching succeeds.

17 Claims, 4 Drawing Sheets

(56) References Cited

U.S. PATENT DOCUMENTS

| | | | |
|---|---|---|---|
| 2016/0180145 A1 | 6/2016 | Setterberg et al. | |
| 2016/0337558 A1 | 11/2016 | Liu et al. | |
| 2016/0337559 A1 | 11/2016 | Liu et al. | |
| 2017/0061191 A1 | 3/2017 | Naruse et al. | |
| 2017/0147800 A1 | 5/2017 | Huang et al. | |
| 2018/0108018 A1 | 4/2018 | Lee et al. | |
| 2019/0278898 A1 | 9/2019 | Liao et al. | |
| 2020/0302428 A1* | 9/2020 | Sambhar | G06Q 20/4012 |

FOREIGN PATENT DOCUMENTS

| | | |
|---|---|---|
| CN | 101320412 A | 12/2008 |
| CN | 103886234 A | 6/2014 |
| CN | 103905875 A | 7/2014 |
| CN | 105405183 A | 3/2016 |
| CN | 106127001 A | 11/2016 |

* cited by examiner

LOGIN METHOD BASED ON FINGERPRINT RECOGNITION AND DEVICE

CROSS-REFERENCE TO RELATED APPLICATIONS

This application is a continuation of U.S. patent application Ser. No. 16/608,517, filed on Oct. 25, 2019, which is a national stage of International Application No. PCT/CN2017/082553, filed on Apr. 28, 2017. Both of the aforementioned applications are hereby incorporated by reference in their entireties.

TECHNICAL FIELD

Embodiments of this application relate to communications technologies, and in particular, to a login fingerprint recognition device.

BACKGROUND

Currently, a user needs to process, by using a computer, a lot of important information related to personal privacy or business transactions. Because a fingerprint is unique, the fingerprint is usually used to confirm a personal identity of the user to ensure information security.

FIG. 1 is a structural block diagram of login by using a fingerprint in the prior art. As shown in FIG. 1, the system includes a fingerprint sensor, a fingerprint authentication apparatus, a memory, a processor, an embedded controller (Embedded Controller, EC), a power controller, a battery, a DC/DC converter, an AC/DC adapter, and a platform power supply. In the prior art, when a fingerprint recognition manner is used for login, in a shutdown state, a VCC 1 usually continuously supplies power to the fingerprint sensor and the fingerprint authentication apparatus. After the fingerprint sensor inputs fingerprint information of a user, the fingerprint authentication apparatus receives the fingerprint information, then outputs a control signal to control the DC/DC converter to output a board platform power supply to power on the system, and verifies whether the fingerprint information matches. If the fingerprint information matches, fingerprint input and board power-on operations are completed, and system login is completed.

However, in the prior art, when the fingerprint login manner is used, power needs to be supplied to the fingerprint sensor in the shutdown state, and therefore, a battery life is reduced.

SUMMARY

Embodiments of this application provide a login method based on fingerprint recognition and a device, to resolve a technical problem that a battery life is relatively short when a fingerprint is used for authentication and login.

According to a first aspect, an embodiment of this application provides a login method based on fingerprint recognition, including:
  collecting fingerprint data when a power-on signal is detected;
  matching the fingerprint data with preset fingerprint data that is prestored; and
  logging in to a terminal device if the matching succeeds.

In this solution, because the terminal device collects the fingerprint data when detecting the power-on signal, the fingerprint data may be input in a process of completing power-on. Therefore, the following phenomenon can be avoided: Power-on and fingerprint authentication operations need to be performed a plurality of times, and power needs to be continuously supplied to a fingerprint sensor in a shutdown state. In this way, not only terminal device login efficiency can be improved, but also a battery life of the terminal device can be increased.

In a possible design, the method further includes:
  if the fingerprint data fails to match the preset fingerprint data that is prestored, outputting prompt information, where the prompt information includes at least one of text information, acoustic information, or light information.

In this solution, if the collected fingerprint data does not match the preset fingerprint data that is prestored, in other words, when the matching fails, prompt information is output to remind a user that an input fingerprint is incorrect.

According to a second aspect, an embodiment of this application provides a terminal device, where the terminal device includes a power button, a fingerprint collection module, a fingerprint recognition module, a power control module, and a login module, and the fingerprint collection module is disposed on the power button, where
  the power control module is configured to: when detecting that the power button is pressed, control power output to supply power to the fingerprint collection module;
  the fingerprint collection module is configured to collect fingerprint data, and send the fingerprint data to the fingerprint recognition module;
  the fingerprint recognition module is configured to match the fingerprint data with preset fingerprint data that is prestored; and
  the login module is configured to log in to the terminal device when the matching performed by the fingerprint recognition module succeeds.

In this solution, because the fingerprint collection module is disposed on the power button, after a user presses the power button, and power is supplied to the fingerprint collection module, the fingerprint collection module starts to collect the fingerprint data. In this way, the fingerprint data may be input in a process of completing power-on. Therefore, the following phenomenon can be avoided: Power-on and fingerprint authentication operations need to be performed a plurality of times, and power needs to be continuously supplied to a fingerprint sensor in a shutdown state. In this way, not only terminal device login efficiency can be improved, but also a battery life of the terminal device can be increased.

In a possible design, the fingerprint recognition module is located in a central processing unit CPU or a micro control unit MCU.

In a possible design, the terminal device further includes a contact, the power button interworks with the contact, and when the contact is closed, the power control module controls power output to supply power to the fingerprint collection module, and a stroke of the power button is less than or equal to a maximum stroke of the power button.

In a possible design, after the matching succeeds, the fingerprint recognition module sends a matching success message to the login module, so that the login module directly performs a login operation.

In a possible design, after the matching succeeds, the fingerprint recognition module sends the prestored fingerprint data to the login module, and this may be applied to various systems with fingerprint verification.

In a possible design, if the fingerprint data fails to match the preset fingerprint data that is prestored, prompt information is output, where the prompt information includes at least one of text information, acoustic information, or light information, to remind the user whether fingerprint recognition succeeds.

In a possible design, after completing fingerprint recognition, the fingerprint recognition module sends the matching success message or the prestored fingerprint data to the login module, to speed up the login.

In a possible design, the fingerprint recognition module caches a matching success result, and sends the matching success message or the preset fingerprint data to the login module when the terminal device enters a login stage, so that fingerprint recognition is synchronized with system login verification.

According to the login method based on fingerprint recognition and the device provided in this application, the fingerprint data is collected when the power-on signal is detected, and the fingerprint data is matched with the preset fingerprint data that is prestored. If the matching succeeds, the user logs in to the terminal device. Because the terminal device collects the fingerprint data when detecting the power-on signal, the fingerprint data may be input in a process of completing power-on. Therefore, the following phenomenon can be avoided: Power-on and fingerprint authentication operations need to be performed a plurality of times, and power needs to be continuously supplied to a fingerprint sensor in a shutdown state. In this way, not only terminal device login efficiency can be improved, but also a battery life of the terminal device can be increased.

DESCRIPTION OF EMBODIMENTS

A login method based on fingerprint recognition in the embodiments of this application is applicable to a terminal device such as a computer or a tablet computer (Portable Android Device, PAD). Certainly, the method may also be applied to another device that has a power button and to which login can be performed by using fingerprint data.

The login method based on fingerprint recognition in the embodiments of this application mainly focuses on how to prolong a battery life while improving user experience when using a fingerprint for verification on terminal device login. In a terminal device login process, there may be two implementations of using a fingerprint for authentication. In one implementation, a power button and a fingerprint sensor are separated, to be specific, a user needs to operate the power button and input a fingerprint once again during login. Consequently, the user needs to perform an operation twice, and has poor experience. In the other implementation, power needs to be continuously supplied to a fingerprint sensor when a system is in a shutdown state, and after a user inputs a fingerprint, components other than the sensor are powered on. If fingerprint authentication succeeds, a login operation is performed. However, in this manner, power needs to be supplied to the fingerprint sensor in the shutdown state, and therefore, a battery life is reduced.

Therefore, the login method based on fingerprint recognition and a device in the embodiments of this application are intended to resolve a problem that power-on and fingerprint authentication operations need to be performed a plurality of times and a technical problem that a battery life is relatively short when a fingerprint is used for authentication and login.

Specific embodiments are used below to describe in detail the technical solutions of this application. The following several specific embodiments may be combined with each other, and a same or similar concept or process may not be described repeatedly in some embodiments.

Figure 1:
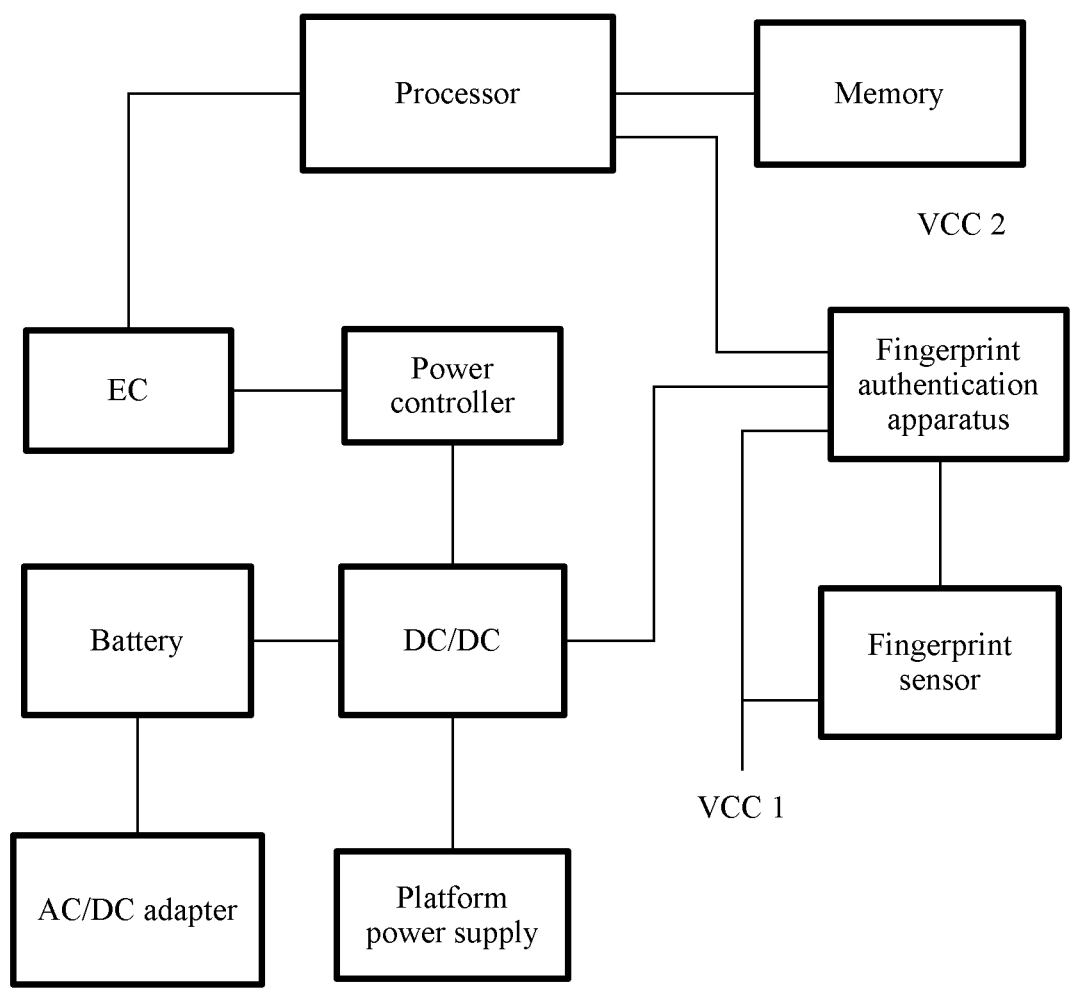
FIG. 1 is a structural block diagram of login by using a fingerprint in the prior art.
Figure 2:
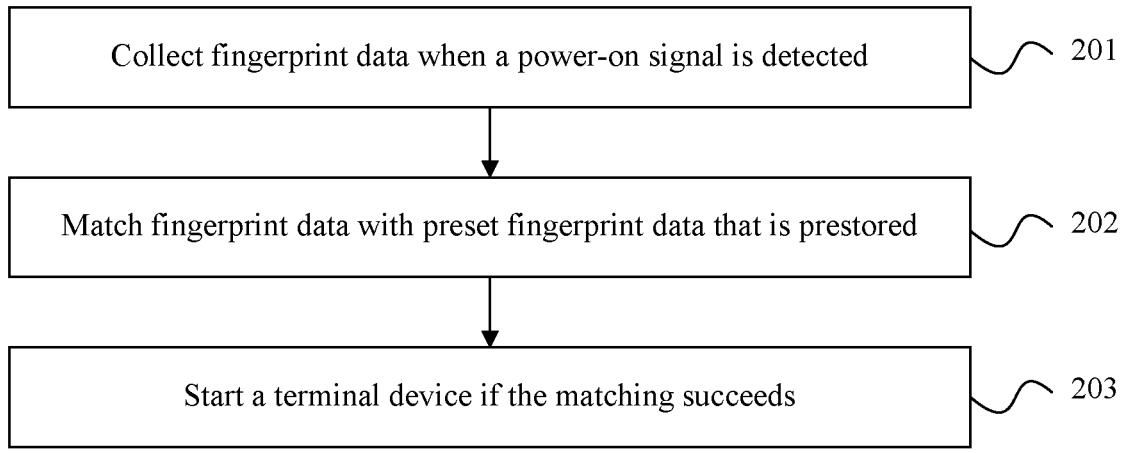
FIG. 2 is a schematic flowchart of Embodiment 1 of a login method based on fingerprint recognition according to this application.

FIG. 2 is a schematic flowchart of Embodiment 1 of a login method based on fingerprint recognition according to this application. This embodiment of this application provides a login method based on fingerprint recognition. The method may be performed by any apparatus that performs the login method based on fingerprint recognition, and the apparatus may be implemented by using software and/or hardware. In this embodiment, the apparatus may be integrated into a terminal device. As shown in FIG. 2, the method in this embodiment may include the following steps.

Step 201: Collect fingerprint data when a power-on signal is detected.

In this embodiment, when a power button is pressed by a user, the terminal device detects the power-on signal. In this case, a power controller in the terminal device controls a DC/DC converter to be powered on to output each path of power supply, including a fingerprint sensor power supply. In a process in which the user presses the power button, a fingerprint sensor is powered on, and starts to collect fingerprint data before a finger of the user leaves the power button.

Step 202: Match the fingerprint data with preset fingerprint data that is prestored.

In this embodiment, fingerprint data of one or more users who are allowed to log in to the terminal device is prestored in the terminal device, and after collecting the fingerprint data, the terminal device matches the collected fingerprint data with the preset fingerprint data that is prestored.

In a possible implementation, the preset fingerprint data may be fingerprint data previously input by the user, or may be fingerprint data obtained through synchronization with a server, and may be a fingerprint image, or may be an eigenvalue extracted based on a fingerprint image. The foregoing data may be encrypted or unencrypted for storage.

Step 203: Log in to the terminal device if the matching succeeds.

In this embodiment, after the terminal device matches the collected fingerprint data with the preset fingerprint data that is prestored, and if the matching succeeds, the user logs in to the terminal device.

According to the login method based on fingerprint recognition provided in this embodiment of this application, the fingerprint data is collected when the power-on signal is detected, and the fingerprint data is matched with the preset fingerprint data that is prestored. If the matching succeeds, the user logs in to the terminal device. Because the terminal device collects the fingerprint data when detecting the power-on signal, the fingerprint data may be input in a process of completing power-on. Therefore, the following phenomenon can be avoided: Power-on and fingerprint authentication operations need to be performed twice, or power needs to be continuously supplied to the fingerprint sensor in a shutdown state. In this way, not only terminal device login efficiency can be improved, but also a battery life of the terminal device can be increased.

Optionally, if the fingerprint data fails to match the preset fingerprint data that is prestored, prompt information is output, where the prompt information includes at least one of text information, acoustic information, or light information. The prompt information may instruct the user to move a finger or press the power button again.

Figure 3:
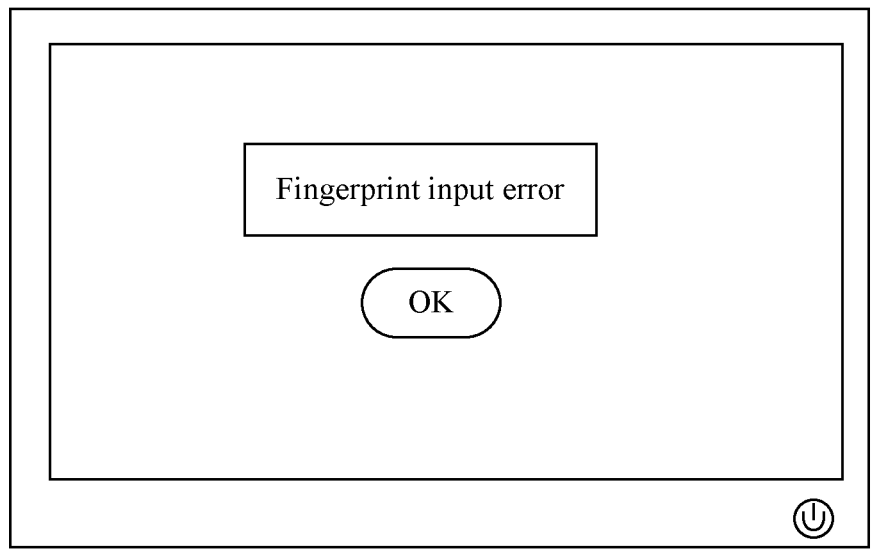
FIG. 3 is a schematic diagram of an interface for outputting prompt information.

Specifically, if the collected fingerprint data does not match the preset fingerprint data that is prestored, in other words, when the matching fails, prompt information is output to remind the user that an input fingerprint is incorrect. FIG. 3 is a schematic diagram of an interface for outputting prompt information. As shown in FIG. 3, if matching fails, "Fingerprint input error" information is shown on the interface of the terminal device to remind the user. In actual application, in addition to the text information, the prompt information may include the acoustic information, the light information, or the like. For example, the terminal device may remind the user through voice broadcast or light blinking or by using acoustic information. In addition, the terminal device may remind the user in only one of the foregoing manners in the prompt information, or remind the user in a combination of two or more of the foregoing manners in the prompt information. A specific manner of the prompt information is not limited in this embodiment.

Figure 4:
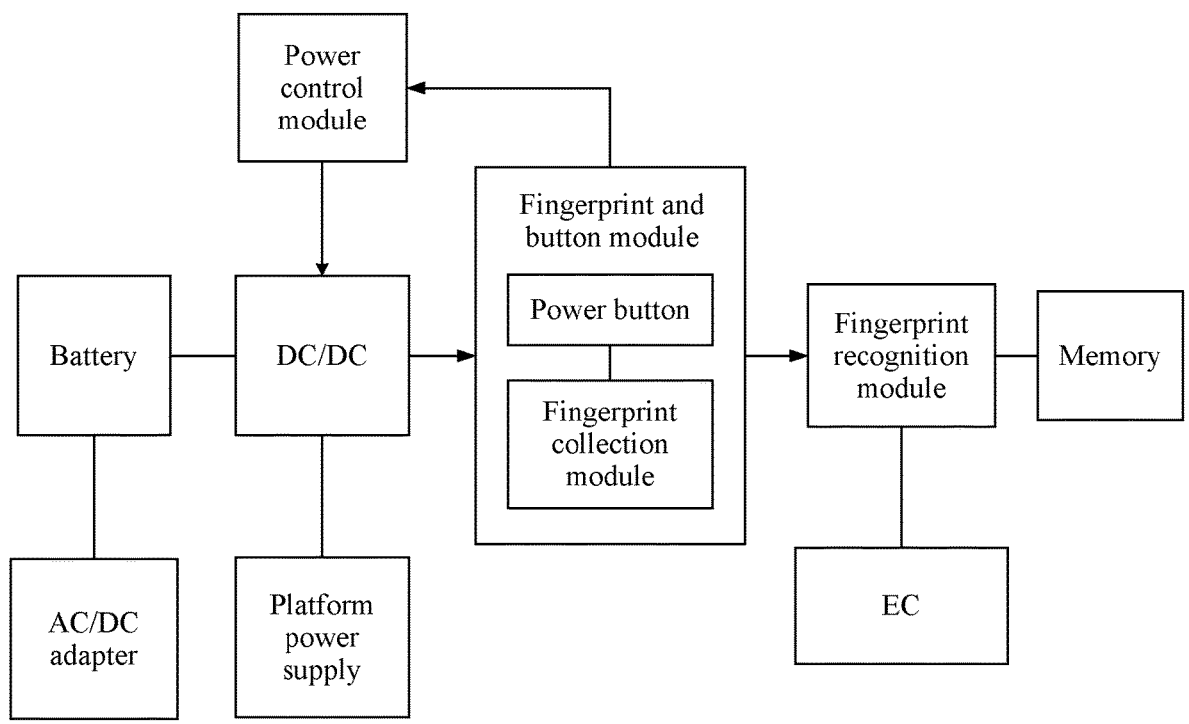
FIG. 4 is a schematic structural diagram of Embodiment 1 of a terminal device according to the embodiments of this application.

FIG. 4 is a schematic structural diagram of Embodiment 1 of a terminal device according to the embodiments of this application. As shown in FIG. 4, the terminal device includes a power button, a fingerprint collection module, a fingerprint recognition module, and a power control module, and the fingerprint collection module is disposed on the power button, where the power control module is configured to: when detecting that the power button is pressed, control power output to supply power to the fingerprint collection module;

the fingerprint collection module is configured to collect fingerprint data, and send the fingerprint data to the fingerprint recognition module;

the fingerprint recognition module is configured to match the fingerprint data with preset fingerprint data that is prestored; and the login module is configured to log in to the terminal device when the matching performed by the fingerprint recognition module succeeds.

In this embodiment, the system includes a fingerprint and button module, the fingerprint recognition module, a memory, an EC, the power control module, a DC/DC converter, a battery, an AC/DC adapter, and a platform power supply, where the fingerprint and button module is configured to provide a power-on/shutdown function and fingerprint input, the battery is an apparatus that supplies power to a board, the AC/DC adapter is an apparatus that charges the battery, the DC/DC converter is a board power converter configured to provide a board chip power supply, the power controller is configured to control the DC/DC converter to output each path of power supply, the fingerprint recognition module is configured to recognize a collected fingerprint, the EC is a board peripheral and I/O control device, the memory is an external memory chip of a processor, and the platform power supply is a power supply for components other than the fingerprint collection module, for example, a CPU power supply or an EC power supply.

The fingerprint collection module is disposed on the power button to form the fingerprint and button module. After a user presses the power button, the power control module detects a power-on signal. In this case, the power control module in the terminal device controls the DC/DC converter to be powered on to output each path of power supply, including a fingerprint collection module power supply. In a process in which the user presses the power button, the fingerprint collection module is powered on, and starts to collect fingerprint data before a finger of the user leaves the power button. The power control module may be a power controller, the fingerprint collection module may be a fingerprint sensor, and the fingerprint recognition module may be a central processing unit (Central Processing Unit, CPU) or a micro control unit (Microcontroller Unit, MCU) of the terminal device.

When the fingerprint recognition module is a CPU, after collecting the fingerprint data, the fingerprint collection module caches the fingerprint data. After the CPU is powered on, the CPU sends a notification message to the fingerprint collection module, and after receiving the notification message, the fingerprint collection module sends the collected fingerprint data to the fingerprint recognition module. The fingerprint collection module may collect only one piece of fingerprint data, and cache the collected fingerprint data. In addition, to increase fingerprint definition and improve fingerprint data recognition efficiency, the fingerprint collection module may collect a plurality of pieces of fingerprint data, select one optimal piece of fingerprint data from the plurality of pieces of fingerprint data through comparison, and cache the data.

Optionally, the fingerprint collection module may further determine, by determining whether the fingerprint collection module and the CPU are synchronously powered on, whether to cache the collected fingerprint data. In actual application, the CPU may output a high level or a low level to the fingerprint collection module by using a GPIO pin. The fingerprint collection module determines, based on the input level, whether the CPU is initialized. If the fingerprint collection module determines that the CPU is initialized, but fingerprint data collection is not completed, the fingerprint collection module may directly send subsequently collected fingerprint data to the fingerprint recognition module instead of caching the collected fingerprint data, thereby improving fingerprint data recognition efficiency.

After receiving the fingerprint data sent by the fingerprint collection module, the fingerprint recognition module matches the fingerprint data with the preset fingerprint data that is prestored. If the matching succeeds, the user logs in to the terminal device. In the fingerprint recognition module, fingerprint data of one user may be prestored, or fingerprint data of a plurality of users who are allowed to log in to the terminal device may be prestored.

In a possible implementation, the Windows system is used as an example. The fingerprint recognition module sends a matching success message to the login module, and the login module may log in to the system. The login module may be a software module for identity recognition in the Windows system, or may be software and/or hardware for sending a login instruction to the Windows system.

Alternatively, after the verification succeeds, the fingerprint recognition module may send the prestored fingerprint data to the login module. This implementation does not change a fingerprint login authentication manner of the system, and may be adapted to various existing systems.

In a possible implementation, after completing fingerprint recognition, the fingerprint recognition module may send the matching success message or the prestored fingerprint data to the login module. Alternatively, there may be a time difference between a fingerprint matching success and system login, in other words, when fingerprint matching succeeds, the system has not entered a login stage. In this case, the fingerprint recognition module may cache a matching success result, and send the matching success message or the preset fingerprint data to the login module when the system enters the login stage.

When the fingerprint recognition module is an MCU, the MCU prestores one or more pieces of fingerprint data, and the MCU is exclusively configured to perform fingerprint data matching. In addition, the fingerprint collection module may further determine, by determining whether the fingerprint collection module and the MCU are synchronously powered on, whether to cache the collected fingerprint data. In actual application, the MCU may output a high-level IO signal or a low-level IO signal to the fingerprint collection module. The fingerprint collection module determines, based on the input level, whether the MCU is powered on. If the fingerprint collection module and the MCU are not synchronously powered on, in other words, the fingerprint collection module is powered on, but the MCU is not powered on, the fingerprint collection module may cache the collected fingerprint data, and after the MCU is powered on, the fingerprint collection module sends the cached fingerprint data to the MCU, so that the MCU performs fingerprint data matching. If the fingerprint collection module determines that the fingerprint collection module and the MCU are synchronously powered on, in other words, the fingerprint collection module determines that the MCU is powered on, but fingerprint data collection is not completed, the fingerprint collection module directly sends subsequently collected fingerprint data to the MCU instead of caching the collected fingerprint data, thereby improving fingerprint recognition efficiency. In addition, if the fingerprint recognition module is an MCU, because the MCU is exclusively configured to perform fingerprint data matching, if the collected fingerprint data fails to match the preset fingerprint data that is prestored in the MCU, before the terminal device enters a login interface, the terminal device may send prompt information to the user to remind the user of a fingerprint input error, thereby improving user experience.

When the fingerprint recognition module is an MCU, after matching the fingerprint data collected by the fingerprint collection module with the preset fingerprint data that is prestored, the MCU may directly send a matching result to the CPU, so that the CPU controls, based on the matching result, whether to log in to the terminal device. If the matching succeeds, the user logs in to the terminal device; or if the matching fails, prompt information is output to remind the user of a fingerprint input error. After performing fingerprint data matching, the MCU directly sends the matching result to the CPU, so that CPU processing efficiency can be improved. Moreover, after performing fingerprint data matching, if the matching succeeds, the MCU may directly send successfully matched fingerprint data to the CPU. The CPU stores the fingerprint data, and controls the user to log in to the terminal device. If the CPU does not receive fingerprint data sent by the MCU, it indicates that the matching fails, and the CPU outputs prompt information to remind the user of a fingerprint data input error.

Optionally, the terminal device further includes a contact, and the power button interworks with the contact. When the contact is closed, a stroke of the power button is less than or equal to a maximum stroke of the power button.

Figure 5:
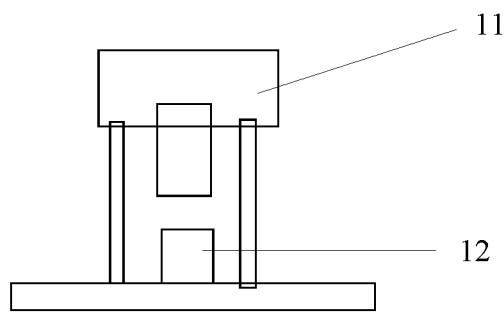
FIG. 5 is a schematic structural diagram 1 of a power button.

Specifically, FIG. 5 is a schematic structural diagram 1 of a power button. As shown in FIG. 5, because a power button 11 interworks with a contact 12, when a user presses the power button 11, the contact 12 also moves accordingly, so that the power control module supplies power to another component of the terminal device. When the user presses the power button 11, the contact 12 is closed, in other words, a circuit is closed, and a stroke of the power button 11 is equal to a maximum stroke of the power button. In this case, because the contact is closed, in other words, the fingerprint collection module can be powered on when the power button is pressed to the maximum stroke, after the user presses the power button, a finger needs to stay on the power button for a preset period of time, to ensure completeness and accuracy of fingerprint data collection. The preset period of time may be set based on experience or an actual situation. For example, the preset period of time may be set to 1 s or 1.5 s. A specific value of the preset period of time is not limited in this embodiment.

The terminal device may further output prompt information, including text information, acoustic information, or light information, to remind the user to press for a period of time. For example, a progress bar is shown on a screen, or an indicator light changes from red to green, so that the user can know whether fingerprint recognition succeeds. The Windows system is used as an example. It takes several seconds to dozens of seconds from power-on to login interface display. If fingerprint recognition does not succeed when the user presses the power button, but this is found after a login interface is displayed on the screen, fingerprint recognition has to be performed once again, causing an inconvenient secondary operation. Further, because the fingerprint collection module is disposed on the power button, the power button may be unintentionally pressed in a second time of fingerprint recognition, making the terminal device to shut down, and causing a misoperation.

Figure 6:
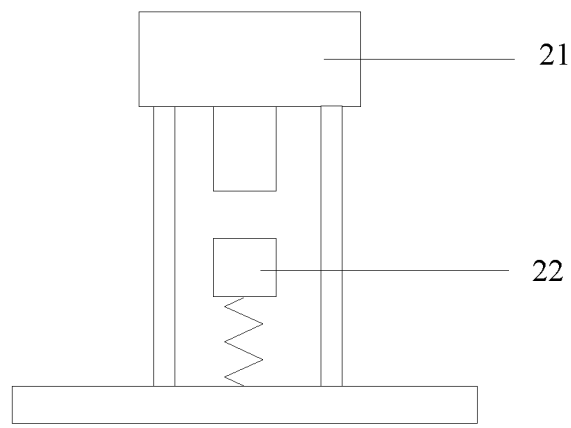
FIG. 6 is a schematic structural diagram 2 of a power button.

FIG. 6 is a schematic structural diagram 2 of a power button. As shown in FIG. 6, on the basis of the foregoing case, when a user presses the power button, and a contact is closed, in other words, a circuit is closed, and a stroke of the power button is less than a maximum stroke of the power button. In this case, because the contact is closed, in other words, the fingerprint collection module is powered on when the power button has not been pressed to the maximum stroke, the user only needs to press the power button to the maximum stroke, so that the fingerprint collection module collects fingerprint data, thereby improving fingerprint data collection efficiency. In addition, to ensure completeness and accuracy of fingerprint data collection, a finger may stay on the power button for a preset period of time when the user presses the power button. The terminal device may also notify a fingerprint recognition result in the foregoing listed manners.

The terminal device provided in this embodiment of this application includes the power button, the fingerprint collection module, the fingerprint recognition module, the power control module, and the login module, and the fingerprint collection module is disposed on the power button. The power control module is configured to: when a power-on signal is detected, control power output to supply power to the fingerprint collection module; the fingerprint collection module is configured to collect the fingerprint data, and send the fingerprint data to the fingerprint recognition module; the fingerprint recognition module is configured to match the fingerprint data with the preset fingerprint data that is prestored; and the login module is configured to log in to the terminal device when the matching performed by the fingerprint recognition module succeeds. Because the fingerprint collection module is disposed on the power button, after the user presses the power button, and power is supplied to the fingerprint collection module, the fingerprint collection module starts to collect the fingerprint data. In this way, the fingerprint data may be input in a process of completing power-on. Therefore, the following phenomenon can be avoided: Power-on and fingerprint authentication operations need to be performed a plurality of times, and power needs to be continuously supplied to a fingerprint sensor in a shutdown state. In this way, not only terminal device login efficiency can be improved, but also a battery life of the terminal device can be increased.

It may be clearly understood by a person skilled in the art that, for the purpose of convenient and brief description, division of the foregoing function modules is used only as an example for illustration. In actual application, the foregoing functions can be allocated to different function modules and implemented based on a requirement, in other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A terminal device, comprising:
    a power button;
    a contact disposed proximate to the power button and configured to move with the power button in response to pressing of the power button by a finger, wherein when the contact is closed, a stroke of the power button is less than a maximum stroke of the power button;
    a fingerprint sensor disposed on the power button;
    a processor; and
    a memory configured to store instructions that when executed by the processor, cause the terminal device to:
        detect, when the terminal device is in a shutdown state, the pressing of the power button by the finger, wherein the fingerprint sensor is not powered on when the terminal device is in the shutdown state;
        in response to detecting the pressing of the power button by the finger:
            powering on the terminal device;
            powering on the fingerprint sensor; and
            collecting, by the fingerprint sensor, fingerprint data before releasing the pressing of the power button; and
        log in to the terminal device in response to the fingerprint data matching with preset fingerprint data.

2. The terminal device of claim 1, further comprising a fingerprint recognition processor configured to match the fingerprint data with the preset fingerprint data.

3. The terminal device of claim 2, wherein the fingerprint recognition processor comprises a micro control unit (MCU).

4. The terminal device of claim 1, wherein the terminal device is configured to output prompt information.

5. The terminal device of claim 4, wherein the prompt information comprises at least one of:
    prompt information informing a user that an input fingerprint is not matched with preset fingerprint data;
    prompt information prompting the user to move the finger;
    prompt information prompting the user to press the power button again; or
    prompt information prompting the user to press the power button for a period of time.

6. The terminal device of claim 4, wherein the prompt information comprises textual information.

7. The terminal device of claim 4, wherein the prompt information comprises acoustic information.

8. The terminal device of claim 4, wherein the prompt information comprises light information.

9. The terminal device of claim 1, wherein the terminal device is configured to cache the fingerprint data.

10. A method implemented by a terminal device and comprising:
    receiving, on a power button of the terminal device when the terminal device is in a shutdown state, a pressing operation input by a finger;
    compressing a contact of the terminal device, wherein the contact is configured to move with the power button in response to the pressing operation, wherein when the contact is closed, a stroke of the power button is less than a maximum stroke of the power button;
    in response to receiving the pressing operation on the power button:

powering on the terminal device;

powering on a fingerprint sensor of the terminal device, wherein the fingerprint sensor is not powered on when the terminal device is in the shutdown state; and collecting fingerprint data before releasing the pressing operation; and logging in to the terminal device in response to the fingerprint data matching with preset fingerprint data.

11. The method of claim 10, wherein the terminal device further comprises a fingerprint recognition processor, wherein the fingerprint recognition processor comprises a central processing unit (CPU) or a micro control unit (MCU), and wherein the method further comprises matching, by the fingerprint recognition processor, the fingerprint data with the preset fingerprint data.

12. The method of claim 10, wherein the method further comprises outputting prompt information when the fingerprint data fails to match the preset fingerprint data.

13. The method of claim 12, wherein the prompt information comprises at least one of:

prompt information informing a user that an input fingerprint is not matched with preset fingerprint data;

prompt information prompting the user to move the finger;

prompt information prompting the user to press the power button again; or prompt information prompting the user to press the power button for a period of time.

14. The method of claim 12, wherein the prompt information comprises at least one of:

text information;

light information; or acoustic information.

15. The method of claim 10, wherein the method further comprises caching the fingerprint data.

16. A non-transitory computer readable storage medium storing one or more programs, wherein the one or more programs include instructions which, when executed by an electronic device, cause the electronic device to:

receive, on a power button of the electronic device when the electronic device is in a shutdown state, a pressing operation input by a finger;

compress a contact of the electronic device, wherein the contact is configured to move with the power button in response to the pressing of the power button by the finger, wherein when the contact is closed, a stroke of the power button is less than a maximum stroke of the power button;

in response to receiving the pressing operation on the power button:

power on the electronic device;

power on a fingerprint sensor of the electronic device, wherein the fingerprint sensor is not powered on when the electronic device is in the shutdown state; and collect fingerprint data before releasing the pressing operation; and log in to the electronic device in response to the fingerprint data match with a preset fingerprint data.

17. The terminal device of claim 2, wherein the fingerprint recognition processor comprises a central processing unit (CPU).

* * * * *